United States Patent [19]

Luoma

[11] 3,885,132

[45] May 20, 1975

[54] DOCUMENT CARD READER

[75] Inventor: Richard William Luoma, Rochester, Minn.

[73] Assignee: International Business Machines Corporation, Armonk, N.Y.

[22] Filed: May 30, 1973

[21] Appl. No.: 365,363

[52] U.S. Cl.... 235/61.11 R; 194/4 E; 235/61.11 C; 235/61.11 R; 340/149 A; 101/47

[51] Int. Cl.... G06k 7/04; G06k 13/02; B41l 45/00; G07f 1/06; G06k 21/04

[58] Field of Search...235/61.11 R, 61.11 A, 61.11 B, 235/61.11 C, 61.7 B, 61.11 E; 340/149 A, 152; 101/47; 179/2 DP, 90 CL; 200/46 R; 194/4 R, 4 E

[56] References Cited

UNITED STATES PATENTS

| | | | |
|---|---|---|---|
| 3,039,582 | 6/1962 | Simjian | 194/4 |
| 3,048,097 | 8/1962 | Miller | 101/47 |
| 3,156,793 | 11/1964 | Rosen | 235/61.11 B |
| 3,419,710 | 12/1968 | Mathews | 235/61.11 E |
| 3,571,799 | 3/1971 | Coker | 340/152 |
| 3,683,156 | 8/1972 | King | 235/61.11 C |
| 3,733,467 | 5/1973 | Bayer | 235/61.11 C |

OTHER PUBLICATIONS

Bowers and Laenen, Credit Card Reader, IBM Technical Manual, Vol. 9, No. 12, May 1967, pg. 1760–1761.

*Primary Examiner*—Daryl W. Cook
*Assistant Examiner*—Robert M. Kilgore
*Attorney, Agent, or Firm*—Keith T. Bleuer

[57] ABSTRACT

A reader for punched document cards having a slide for carrying a document card and movable manually against the action of a spring to put the document card in a pre-reading position, a governor for controlling the motion of the slide and document card in a return movement generated by the spring and a series of switches actuated by the punchings as the card returns under spring action to an initial position. One way clutch mechanism is associated with the governor so that the initial movement of the slide and document card may not be impeded by governor action. A latch operated by the slide is effective to prevent movement of the slide manually out of its initial position with no card in the reader, and the latch is negated in its action by a card in position so that the slide and card may be moved out of initial position.

6 Claims, 15 Drawing Figures

DOCUMENT CARD READER

BACKGROUND OF THE INVENTION

The invention relates to readers for document cards that have punched data carrying holes therein.

Prior readers for such document cards have generally included a power driven transport for moving a series of such document cards secured from a hopper past a read station. As the cards move past the read station, electric switches sense the data carrying openings in the card.

Readers for reading such document cards individually have also been proposed. In Wolfheimer, U.S. Pat. No. 3,132,241, such a card reading mechanism was proposed in which, as a card is inserted into the card receiver, a hole sensing projection on each of a plurality of slider assemblies senses for a hole in a corresponding column of the document. The document is inserted manually into the document receiver.

A more sophisticated document card reader of this general type was proposed in Thorne, U.S. Pat. No. 3,505,500. In this structure, reading is accomplished of the openings in a document card under the control of a swinging handle, and a governor was provided in connection with the swinging handle for controlling the reading action.

SUMMARY OF THE INVENTION

It is an object of the present invention to provide an improved manually operated individual card reader for cards of this type which allows the operator to manually insert a card into a carriage or slide and move the carriage and document card linearly to an initial non-reading position, with the machine being arranged to return the card back at a constant speed and with the reading being accomplished during this return movement. It is also an object of the invention to provide latching mechanism preventing the movement of the slide or carriage in a forward direction unless a document card has been inserted in position in the slide.

It is also an object of the invention to provide such an improved reader which has switch means for supplying a controlling pulse for each row of potential openings in the document card, regardless of the fact that there may be no data carrying openings actually in each row in the card, for controlling circuitry connected with the reader.

DESCRIPTION OF THE PREFERRED EMBODIMENT

Figure 2:
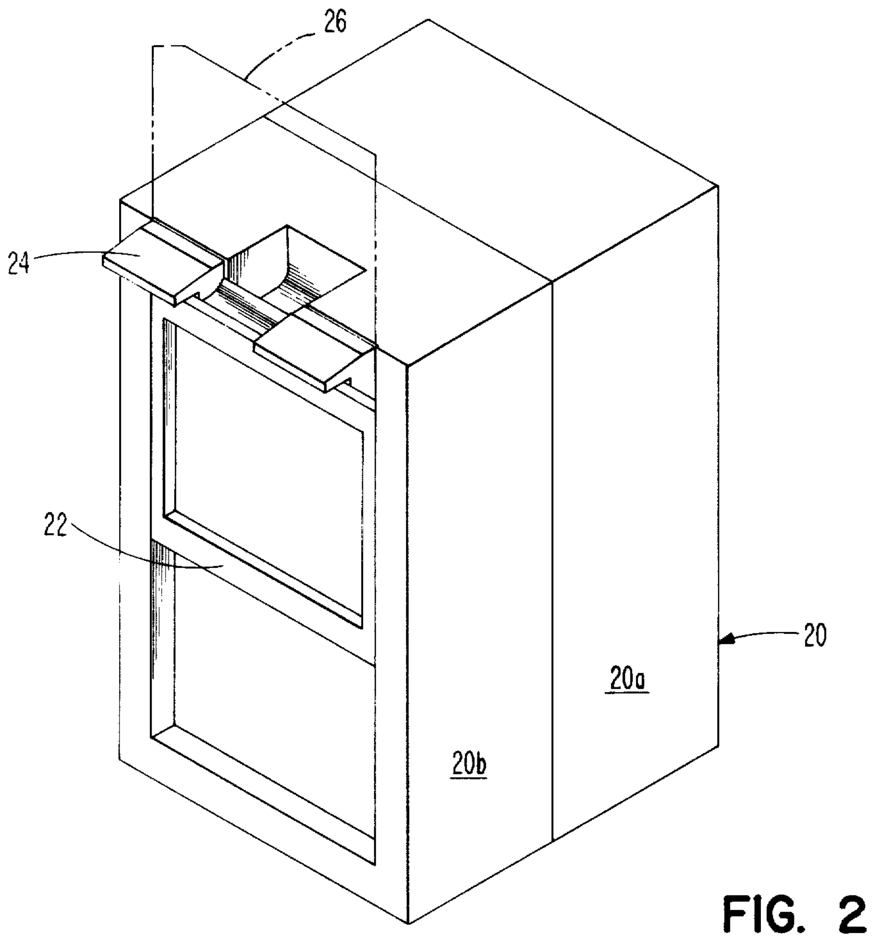
FIG. 2 is a perspective view of the document card reader of the invention.

Referring to the drawings and to FIG. 2 in particular, the document card reader of the invention may be seen to comprise, viewed exteriorly, a machine housing 20 made up of a rear cover or housing portion 20*a* and a front cover or housing portion 20*b*. A slide or carriage 22 is located on the front side of the housing 20, and the slide contains a pressure plate 24 which ordinarily moves vertically along with the slide 22. A document card 26 may be carried between the slide 22 and pressure plate 24, and the card 26 is read by the machine particularly after the slide 22 and pressure plate 24 return and move upwardly after a preliminary downward movement in the machine.

Figure 1:
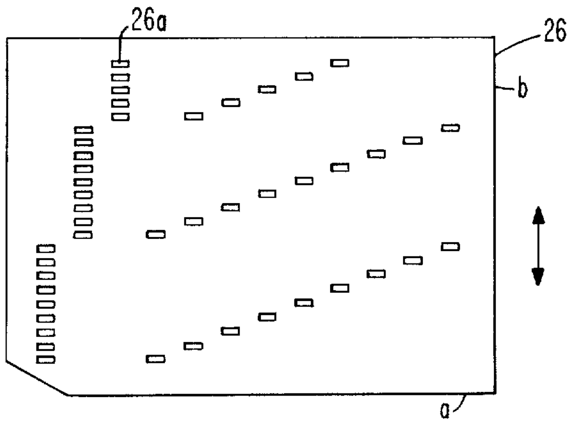
FIG. 1 is a face view of a document card that may be used in the card reader of the invention.
Figure 3:
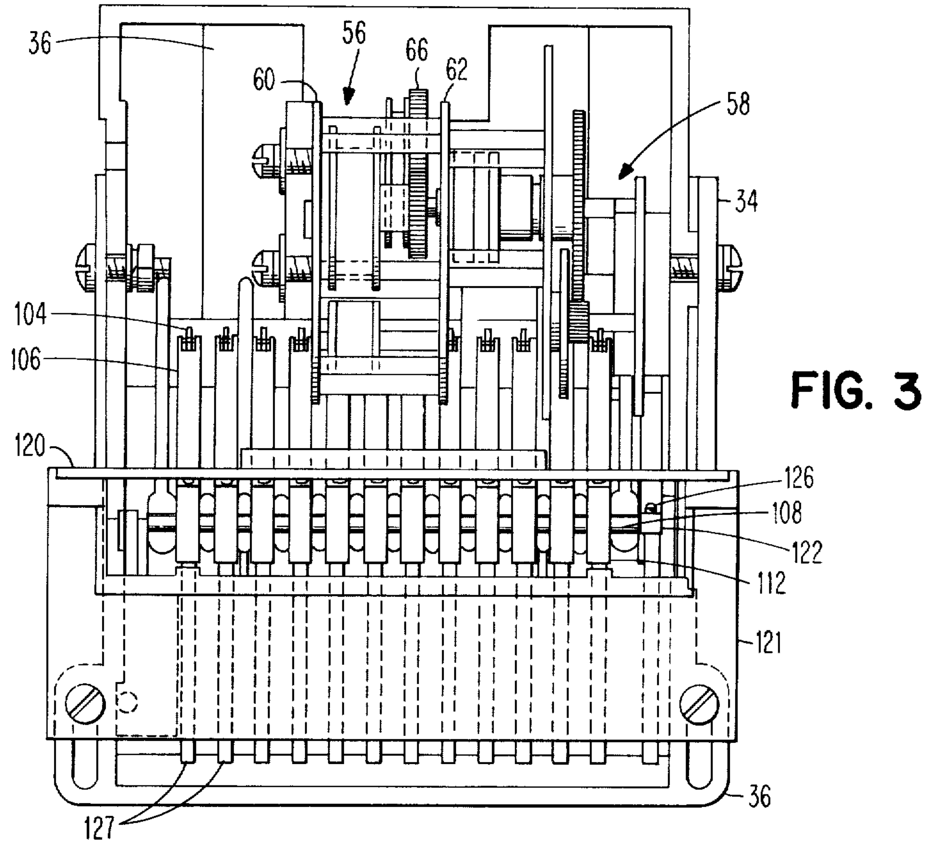
FIG. 3 is a rear view of the reader with the rear portion of the housing of the reader removed.
Figure 4:
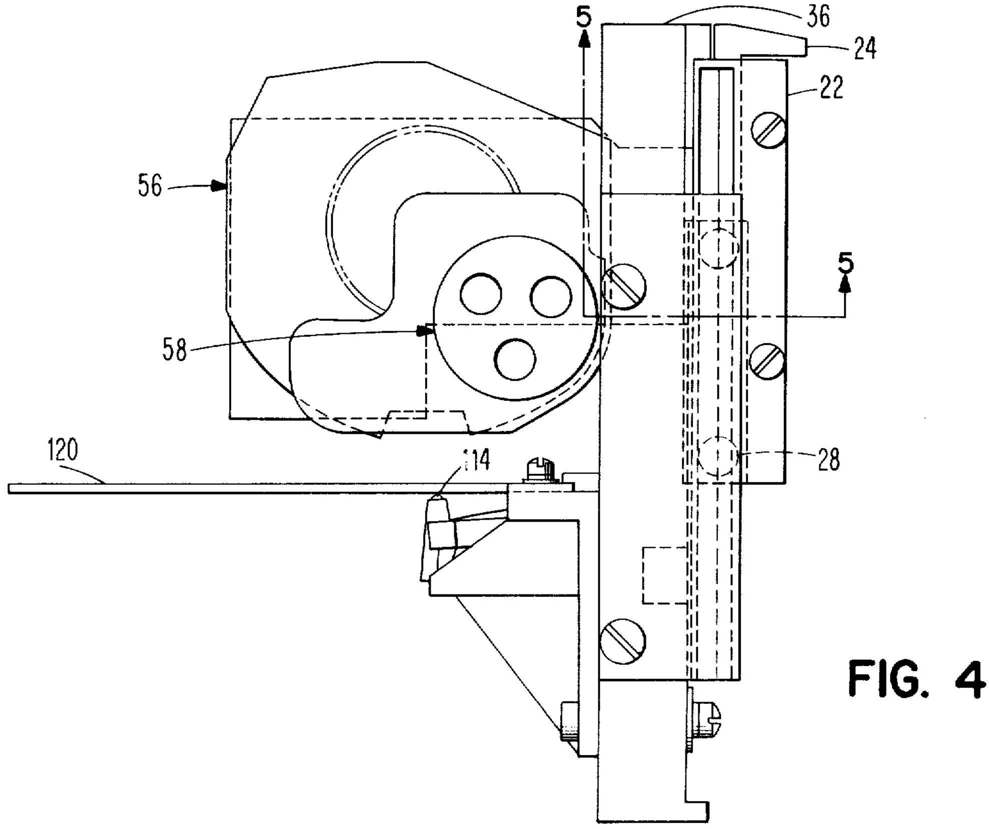
FIG. 4 is a side view of the internal mechanism of the reader.
Figure 5:
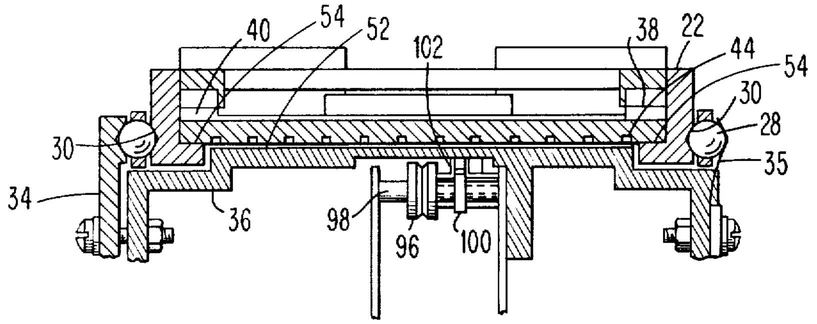
FIG. 5 is a sectional view taken on line 5—5 of FIG. 4.
Figure 6:
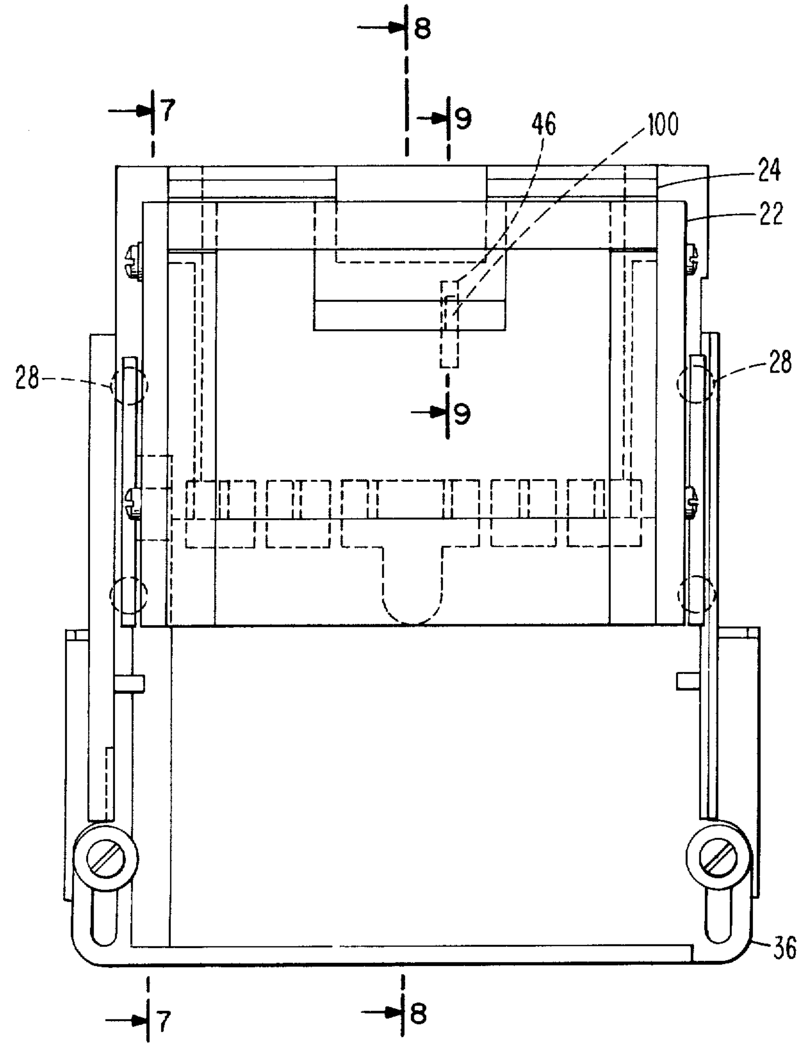
FIG. 6 is a front view of the reader with the covers removed.

Referring to FIG. 1, the card 26 may be seen to be oblong in shape, having long sides *a* and short sides *b*. A plurality of openings 26*a* may be punched in the card 26, and these may be located in 12 vertical columns (extending perpendicularly to the sides a) and may be located in 22 rows (extending parallel with the edges a).

The front housing portion or cover 20*b* carries all of the mechanism by means of which the machine is capable of reading the holes 26*a* punched in the card 26. The slide 22 is moveably disposed in the housing 20 by means of bearing balls 28 positioned in longitudinal grooves 30 provided in side edges of the slide 22 and grooves 32 provided in parts 34 and 35 that are fixed with respect to the housing portion 20*b* by means of a frame 36. A pair of spring leaves 38 are carried by the slide 22, particularly in edge slots 40 of the slide 22. The leaves 38 have return bent end portions 42 that cooperate with the pressure plate 24 as will be described.

The pressure plate 24 is provided with 12 vertical grooves 44 and a short slot 46 on one face and is provided with end slots 48 and 50 on its other face. The pressure plate 24 may be moved downwardly in the slots 40 of the slide 22 in order to position the pressure plate properly in the slide 22; and, in this case, the pressure plate 24 is disposed in close proximity to (but not touching) a card bed 52 of frame 36 fixed with respect to the cover portion 20*b*. As the pressure plate 24 is initially put into the slots 40, it fits rather loosely therein, so that a card 26 of varying thickness may loosely be positioned between the pressure plate 24 and the bed 52; however, as the pressure plate 24 is moved down toward the limit of its movement in the slots 40, the spring ends 42 ride out of the slots 48 and 50 onto higher adjacent portions of the plate 24 so as to grip the card 26 between the plate 24 and the slide 22. The card 26 is gripped in particular between plate 24 and internal surfaces 54 of slide 22 bounding slots 40.

The slide 22 is moved downwardly, with the balls 28 moving in the grooves 30 and 32 against the action of spring mechanism 56, and this spring mechanism functions to return the slide 22 back into its original position, with a governor 58 controlling the speed of return movement of the slide 22. The spring mechanism 56 comprises a pair of plates 60 and 62 that are anchored with respect to the frame 36. A pulley 64 and a gear 66 are fixed on a shaft 68 that is rotatably disposed in the plates 60 and 62. A wire cable 70 is wound on the pulley 64 and has one end fixed with respect to the pulley. The cable 70 is connected with the slide 22 as will be hereinafter described.

The gear 66 is in mesh with a gear 72 that is fixed onto a shaft 74 rotatably disposed in the plates 60 and 62. A drum 76 is disposed along side of the gear 72 and is also fixed on the shaft 74. A spring 78 has an end thereof fixed to the exterior surface of the drum 76. A takeup drum 80 is positioned on a shaft 82 that is rotatably disposed in the plates 60 and 62, and the spring 78 is disposed on the outer peripheral surface of the drum 80. The spring 78 in normal condition is in the form of a helix hugging the drum 80, and force is required in order to unwind the spring 78 from the drum 80.

A one-way clutch 84 is provided on the shaft 74 and functions to provide a driving connection in one direction between the shaft 74 and the governor 58. The one-way clutch 84 comprises a hub member 86 fixed on shaft 74 and having radially extending grooves 88 in a face thereof, the bottom faces of which are slanted so as to provide abutments 90 on one side of each of the grooves 88. A hub member 92 constitutes the driver of the governor 58, and a pad 94 is provided between the members 86 and 92 and is fixed to the member 92. The pad 94 is of a conventional material having a plurality of relatively stiff fibers fastened to a backing, and the fibers extend slantwise from the backing in a direction so as to engage the abutments 90 of the member 86, whereby these abutments drive the hub 92 is one direction; but the bottom faces of the grooves 88 bend the fibers toward their backing so as to allow substantially free rotation of the hub member 86 in the other direction, without a corresponding movement of any governor parts.

The governor 58 may be of a conventional construction, such as of the type used in an ordinary dial telephone; and the governor 58 regulates the rotation of the hub member 86 and connected parts when the hub member 86 tends to rotate in a direction in which the abutments 90 engage with the fibers of the pad 94.

The cable 70 extends over a spool 96 that is fixed on a shaft 98. The shaft 98 is rotatably disposed with respect to plates 60 and 62, and a latch 100 is disposed on the shaft 98 and has a substantial frictional engagement therewith. A slot 102 is provided in the bed 52, and the latch 100 is adapted to swing through the slot 102 so that, under certain conditions, the latch 100 abuts the end of the slot 46 and prevents a downward movement of the pressure plate 24. The cable 70 extends from the spool 96 to the lower end of the slide 22 to which it is anchored.

The holes 26a in the card 26 are sensed by means of starwheels 104 which are rotatably disposed in levers 106. The levers 106 are rotatably disposed on a shaft 108 carried by the frame member 36. Each of the levers 106 has a leaf spring 110 embedded in it at one end of the leaf spring, and the leaf spring 110 at its other end carries a button structure 112. The structure 112 has a button 114 on its upper end and is provided with a slot 116 on one face. The associated lever 106 has an arm 118 that extends into the slot of the structure 112. A plate 120 is fixed with respect to a frame member 121 which in turn is fixed to the frame member 36; and the plate 120 carries a plurality of electrical switches to be hereinafter described which are actuated when the buttons 114 are respectively moved into contact with the lower face of the plate 120.

A timing lever 122 is swingably disposed on the shaft 108 and has a configuration similar to the levers 106. The lever 122 has an arm 124, and a set screw 126 extends through the end of the arm 124. The set screw 126 functions the same as a button 114 in completing a circuit when the upper end of the set screw 126 is moved into engagement with the lower face of the plate 120. Return springs 127 are provided for levers 106 and 122.

A pawl 128 is swingably mounted on the upper end of the lever 122. An inner surface of the slide 22 is provided with teeth 130 and has a lower slanted cam portion 132. The pawl 128 is so constructed that it moves downwardly under the influence of the teeth 130 as the slide 22 is moved downwardly so that no oscillating movement of the arm 124 and screw 126 take place under these conditions; however, when the slide 22 reverses its movement and moves upwardly under the action of the spring 78, the teeth 130 oscillate the lever 122 about the shaft 108, one oscillation for each of the teeth 130.

Figures 7, 8, 12:
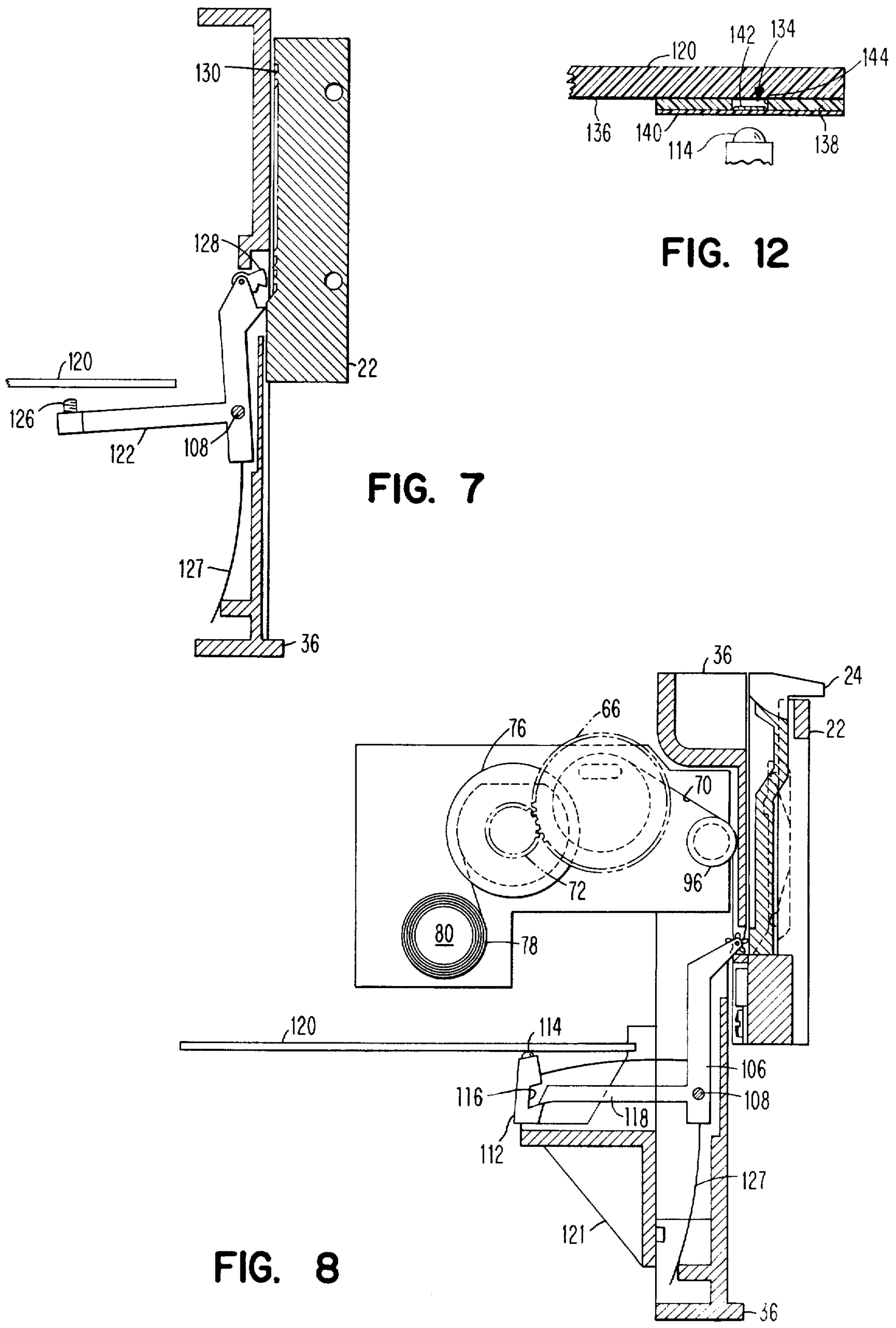
FIG. 7 is a sectional view taken on line 7—7 of FIG. 6.
FIG. 8 is a sectional view taken on line 8—8 of FIG. 6; cover
FIG. 12 is a sectional view on an enlarged scale taken on line 12—12 of FIG. 11B and showing one of the electrical switches of the reader.
Figure 9:
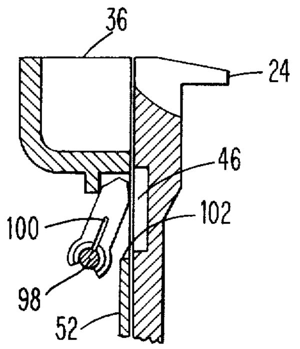
FIG. 9 is a sectional view taken on line 9—9 of FIG. 6.
Figure 10:
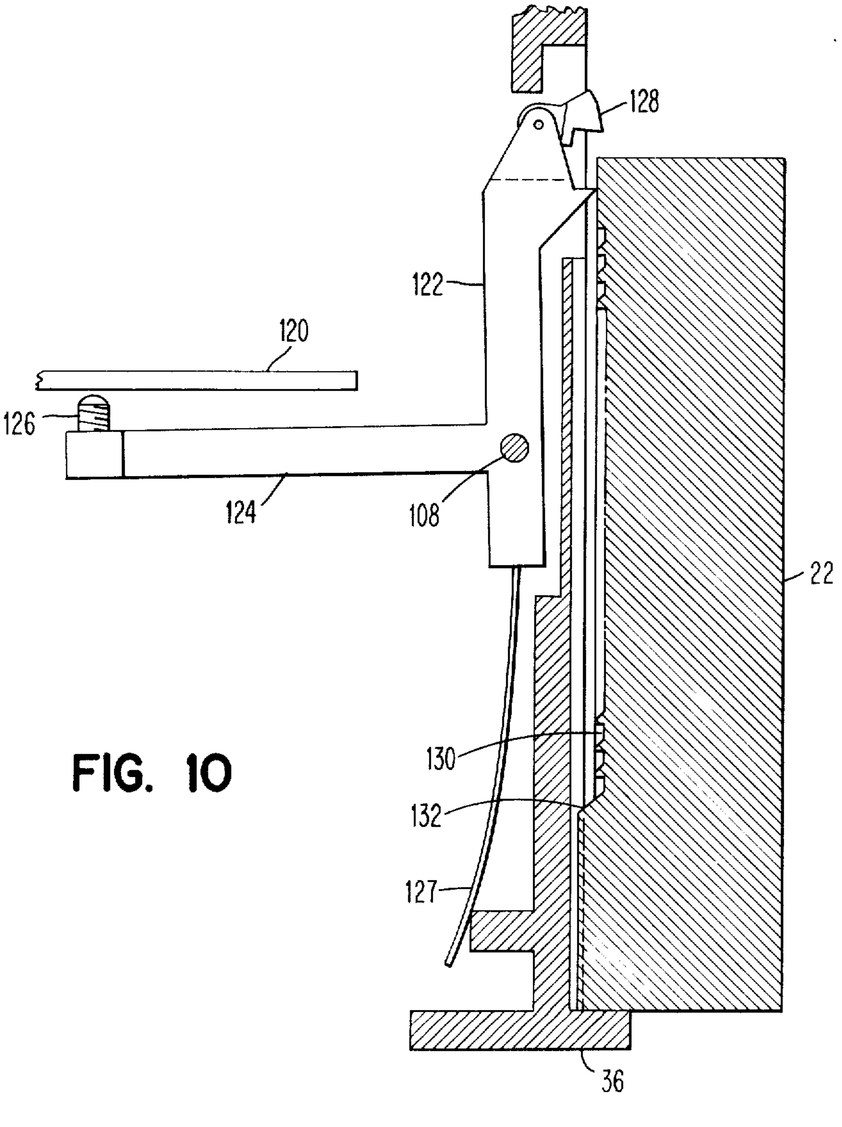
FIG. 10 is a view similar to FIG. 7 but taken on an enlarged scale and showing certain of the parts in changed positions.
Figure 11A:
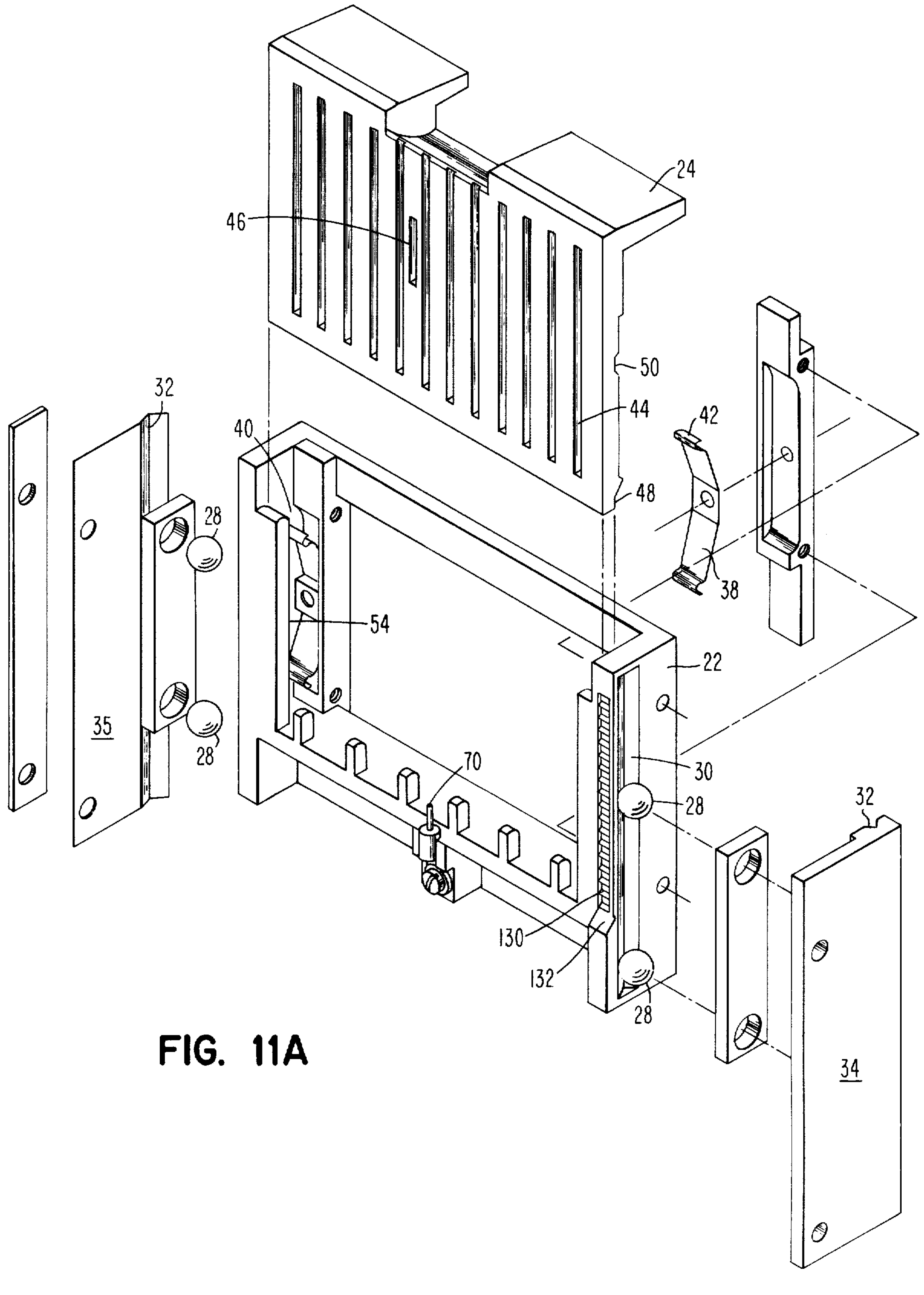
FIGS. 11A, 11B, 11C and 11D are exploded views of various of the internal parts of the reader.
Figure 11B:
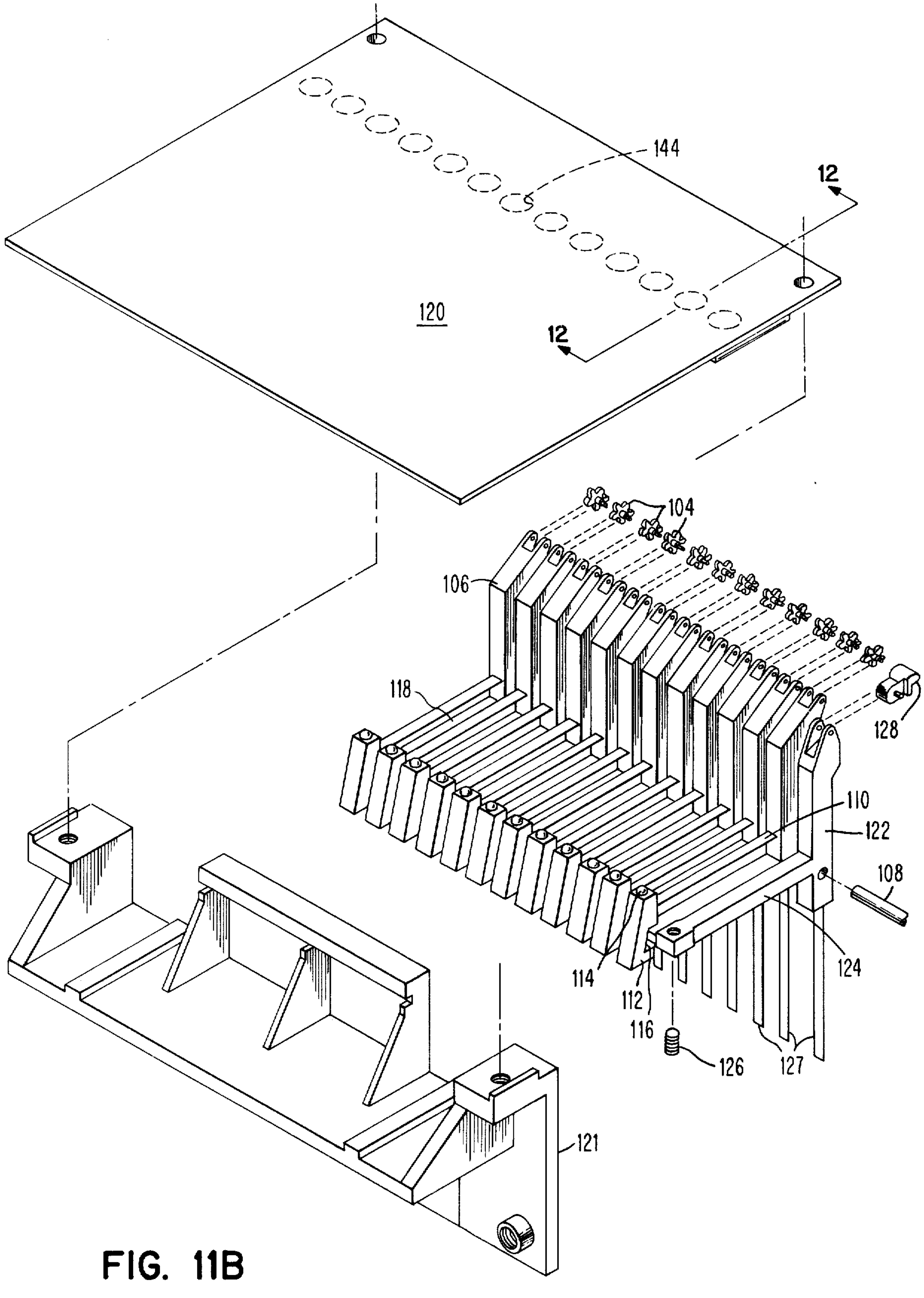
Figure 11C:
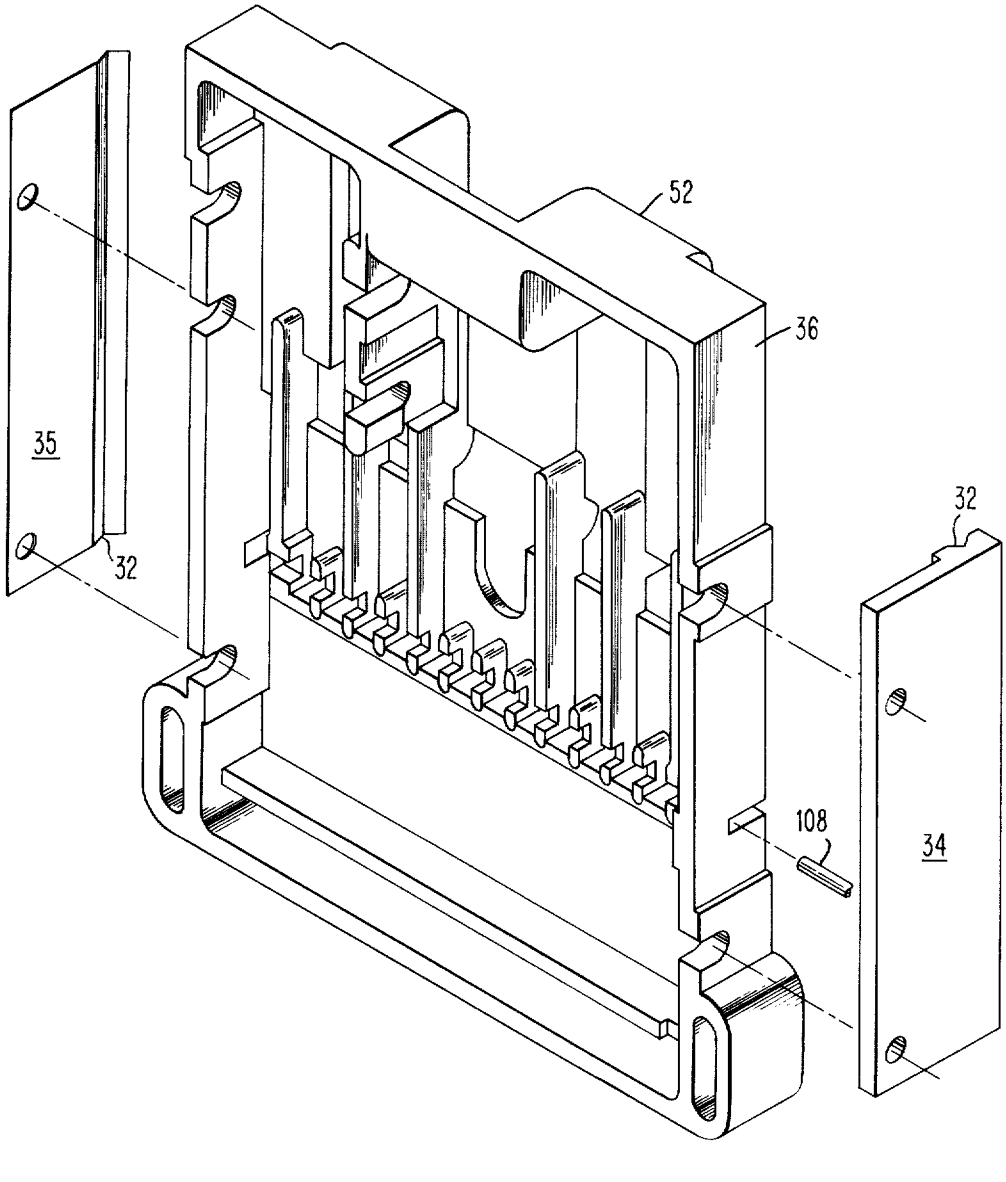
Figure 11D:
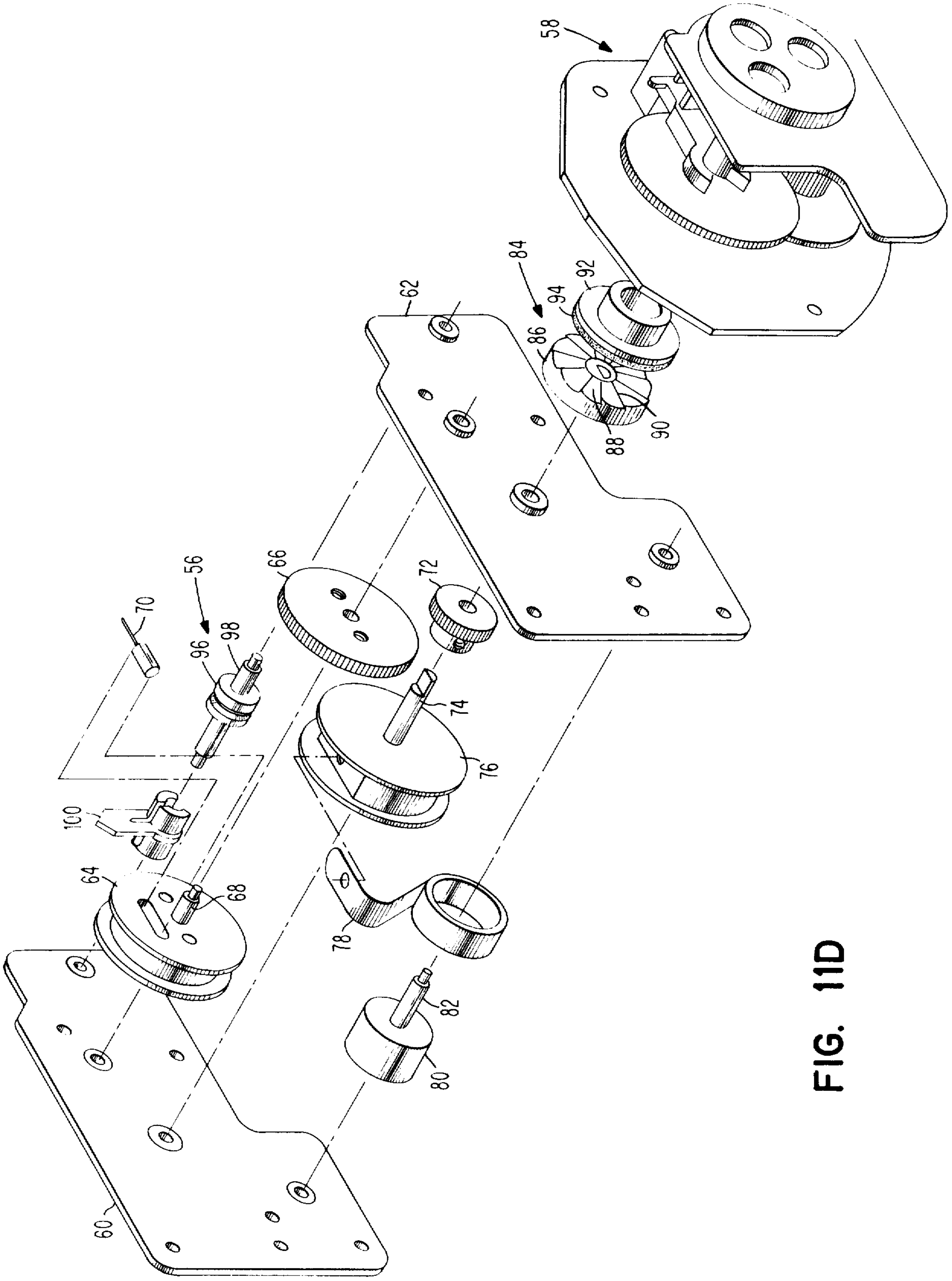

One of the switches 134 actuated by a button 114 (or screw 126) is illustrated in FIG. 12. The switch 134 is of the elastic diaphragm type and includes a conductor 136 on the bottom surface of the board 120, a spacer 138 below the conductor 136 and a diaphragm 140 below the spacer 138. The diaphragm 140 carries a conductor 142 located immediately above the button 114. The board 120, for example, can be of relatively rigid material 0.060 inch thick. The spacer 138 is also of relatively rigid material and may be 0.003 inch thick. The diaphragm 140 is flexible and is of very thin material, such as 0.0005 inch thick. The conductors 136 and 142 may simply be made up of plating respectively on the board 120 and on the diaphragm 140. The spacer 138 and the diaphragm 140 are bonded together and to the board 120. The conductors 142 are disposed in openings 144 in spacer 138 and are spaced from conductors 136. When a button 114 is moved against the lower face of diaphragm 140, the diaphragm 140 is bowed upwardly so as to bring the conductor 142 into contact with the conductor 136 to thus complete an electrical circuit between the conductors 142 and 136.

Assuming there is no card 26 in the machine, a downward movement of the slide 22 and pressure plate 24 will cause a slight rotary movement of the spool 96, shaft 98 and latch 100 due to the frictional action of the cable 70 on the spool 96, so that the latch 100 will protrude through the slot 102 and will enter the slot 46 in the plate 24 to prevent any substantial movement of the slide 22 and plate 24 downwardly. In this case, the starwheels 104 travel short distances within the slots 44 in the pressure plate 24.

When the pressure plate 24 is raised slightly with respect to the slide 22, so that the spring ends 42 are within the slots 48 and 50, the card 26 may then be easily moved into place in the slide 22, between the pressure plate 24 and the card bed 52. There is a clearance between the plate 24 and surfaces 54 allowing this easy insertion of a card 26 into the slide 22. When the pressure plate 24 is moved downwardly slightly with respect to slide 22, the spring ends 42 ride up out of the slots 48 and 50, and the card 26 is gripped between the pressure plate 24 and surfaces 54 to thus fix the card with respect to the slide 22. The surfaces 54 at all times provide a predetermined clearance between the card 26 and the bed plate 52, and cards of varying thickness may be accommodated in the machine due to the springs 40 which flex to a greater extent when cards of greater thickness are used in the machine.

The slide 22, pressure plate 24 and card 26 may then be moved downwardly in the machine out of their initial uppermost positions by putting pressure on the uppermost surfaces of the plate 24; and movement of these parts downwardly in the machine takes place with the cable unwrapping from the pulley 64, with corresponding movements of the gears 66 and 72 and of the drum 76. The spring 78 winds up on the drum 76 under these conditions, unwinding from the takeup drum 80. Since the spring 78 is in a normal condition wound on the drum 80, the downward movement of the plate 24, card 26 and slide 22 takes place against the restraining action of the spring 78. Since the card 26 is in place, under these conditions the latch 100 is not effective to block downward movement of the slide 22.

When the slide 22 has reached the downward limit of its movement (with the card 26 being in a prereading position at this time), the plate 24 is released movable by the operator; and the parts 22 and 24, together with the card 26, move upwardly. This upward movement is due to action of the spring 78 winding back up on the drum 80; and slide 22 is raised by the action of the drum 76, gears 72 and 66, drum 64 and cable 70. The drum 76, gear 72 and shaft 74 rotate in a direction to engage the one-way clutch 84; and the governor limits the rotation of these parts to a constant rotative speed and thus limits the upward movement of the slide 22 and card 26 to a constant linear speed for reliable reading of the holes **26*a*. Under these conditions, the starwheels 104 enter the openings 26*a* of the card 26, and the associated levers 106 rotate so as to bring their buttons 114 into contact with the lower surface of the plate 120 just below the respective conductor 142 for each opening 26*a*. Therefore, whenever a hole 26*a* exists, the asociated button 114 causes the completion of an electrical circuit by means of a conductor 142. There are a corresponding number of teeth 130 for the 22 rows of openings 26*a* on the card 26, and there is an oscillation of the lever 122 for each of the teeth 130 and for each of the 22 rows. The screw 126 carried by lever 122 and the associated conductors 136 and 142 may be used to provide timed impulses for the 22** hole rows to control associated read circuitry (not shown).

Advantageously, the machine constitutes a manually operated single card reader which accommodates documents 26 that vary substantially in thickness without any adjustment. All openings **26*a* are read simultaneously, row by row at a constant rate which may be by low voltage, low current signals controlled by switch buttons 114. The unit requires no AC electrical power, since the power is supplied by the spring motor mechanism which is energized in the act of loading a document card 26. After a document card 26 is inserted between the pressure plate 24 and the card bed 52, it is simply necessary for the operator to move the pressure plate 24 and slide 22 down to the limit of the movement of the latter and then release the plate 24. The slide 22, pressure plate 24, and card 26 then return to their original positions as the document is being read, and this reading takes place at a controlled speed due to the action of the governor 58. The latch 100 prevents the slide 22 and pressure plate 24 from being pushed downwardly unless a document card 26 has been inserted into its proper position in the machine. Thus, when no card 26 is present in the slide 22, no electrical pulses can be produced by the set screw 126 carried by lever 122, and the circuitry connected with the card reader cannot be influenced to register invalid data. Due to the action of the one-way clutch 84, it is not necessary to move the slide 22 and pressure plate 24 against the impeding action of the governor 58, and the governor 58 is effective only when the spring 78 acts to return the parts to their original positions. It will be noted that the slot 116 in each of the structures 112 has a greater length than the thickness of the lever arms 118, and this constitutes a built-in over-travel device that enables relaxation of card registration tolerances. It will be noted that the pawl 128 is of such construction that the set screw 126, constituting a switch button, is positioned away from the associated switch 134 as the slide 22 and pressure plate 24 are moved downwardly in the machine. Therefore, the set screw 126 as a switch button identifies each row of holes 26*a* as the card 26 is being read when the card moves upwardly in the machine, but no electrical pulses can be produced by the set screw 126 functioning as a switch button when the slide 22 and pressure plate 24** are moved downwardly in the machine prior to the reading action by the machine. This also prevents the registering of invalid data by the associated circuitry.

I claim:

1. A machine for reading document cards having data indicative holes therethrough located at the intersections of rows and columns, a frame, a carriage slideably mounted with respect to said frame so as to have a linear movement with respect to the frame in a certain path and adapted to carry a document card so that the card moves in the direction of its said columns along with movement of the carriage, a row of detectors extending transversely of said path each adapted to detect the holes in one of said columns of a document card carried by said carriage as the carriage moves along its said path, spring means effective on said carriage and yielding to allow said carriage and a document card carried thereby to be moved from initial positions at one end of said path to pre-read positions at the other end of said path and applying a spring force in a direction to return the carriage and a document card carried thereby back to their initial positions from their said pre-read positions, and speed limiting governor mechanism acting on said carriage and against the spring force from said spring means and limiting the speed of the carriage in returning back to its initial position from its pre-read position to a predetermined speed so that the document card carried by said carriage passes across said detectors at a constant speed and each of said detectors is effective to detect the holes in successive rows after equal time intervals for dependable hole detecting action.

2. A machine as set forth in claim 1 and including a one-way clutch effectively between said carriage and said governor mechanism so as to effectively disconnect said carriage with respect to said governor mechanism on a movement of the carriage from its said initial position to its said pre-read position whereby the carriage can be manually moved without governor restraint at a speed greater than said constant speed from its initial position to its pre-read position.

3. A machine as set forth in claim 1 and including, timing switch means, a series of teeth on said carriage corresponding to said rows of holes in said document card, and dual position means responsive to the direction of movement of said carriage in said path in one direction or the other for causing said teeth to actuate said timing switch means for each of the teeth on a movement of said carriage from its said pre-read position back to its initial position and for disconnecting said teeth with respect to said timing switch means for a movement of the carriage from its said initial position to its said pre-read position.

4. A machine as set forth in claim 3, said dual position means including a two position pawl carried by said timing switch means, cam means carried by said carriage and effective on said pawl in said pre-read position of the carriage for moving the pawl into one of its two positions in which said teeth are effective on the pawl and therefore effective on said timing switch means for actuating the timing switch means as the carriage moves from its pre-read position back to its initial position, and cam means effective on said pawl for moving the pawl into the other of its two positions when the carriage is in its initial position so that the teeth are not effective on the timing switch means as the carriage is moved from its initial position to its pre-read position.

5. A machine for reading document cards having data indicative holes therethrough located at the intersections of rows and columns;

a frame;

a carriage slideably mounted with respect to said frame so as to have a linear movement from an initial, pre-read position at one end of a path to the other end of the path and adapted to carry a document card which is insertable in the carriage at its said initial position so that the card moves from said pre-read position of the carriage toward the other end of said path in the direction of said columns of said card along with movement of the carriage;

spring means for yieldably holding said carriage in its said pre-read position and returning said carriage from said other end of said path toward its said pre-read position;

a row of detectors extending transversely of said path each adapted to detect the holes in one of said columns of a document card carried by said carriage as the carriage moves along its said path;

an abutment on said carriage;

blocking means adapted to engage with said abutment for preventing the movement of said carriage out of its said pre-read, initial position toward its position at the other end of said path when the blocking means is operative; and means for mounting said blocking means so that it moves through a position occupied by a card held by said carriage to engage with said abutment so that the blocking means is rendered inoperative for blocking the movement of said carriage from its initial, pre-read position toward the other end of said path by a document card carried in said carriage.

6. A machine as set forth in claim 5, said blocking means including a latch and said mounting means including a shaft carrying said latch and having a connection therewith and having a driving connection with said carriage so that, when said carriage is given a preliminary movement from its initial pre-read position toward the other end of said path, the latch swings to engage said abutment on said carriage for preventing movement of said carriage from its initial position toward the other end of said path;

said connection of said latch with said shaft constituting a lost motion connection so that the latch is held unlatched from said abutment by a document card in the carriage with movement of the carriage and document card from their initial positions to their positions at the other end of said path and with corresponding rotation of said shaft.

* * * * *